(12) United States Patent
Kim et al.

(10) Patent No.: US 8,856,442 B2
(45) Date of Patent: Oct. 7, 2014

(54) METHOD FOR VOLUME MANAGEMENT

(75) Inventors: Young Hwan Kim, Yongin-si (KR); Jae Gi Son, Yongin-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 183 days.

(21) Appl. No.: 13/536,260

(22) Filed: Jun. 28, 2012

(65) Prior Publication Data

US 2013/0191591 A1 Jul. 25, 2013

(30) Foreign Application Priority Data

Jan. 25, 2012 (KR) .......................... 10-2012-0007238
Jan. 25, 2012 (KR) .......................... 10-2012-0007250

(51) Int. Cl.
*G06F 12/08* (2006.01)

(52) U.S. Cl.
USPC .................................. 711/114; 711/E12.019

(58) Field of Classification Search
CPC ... G06F 3/0689; G06F 11/1076; G06F 3/067; G06F 3/061
USPC ........................................... 711/114, E12.019
See application file for complete search history.

(56) References Cited

U.S. PATENT DOCUMENTS 8,555,018 B1 * 10/2013 Rohr et al. ..................... 711/165

* cited by examiner

*Primary Examiner* — Yong Choe
(74) *Attorney, Agent, or Firm* — Lowe Hauptman & Ham, LLP

(57) ABSTRACT

A computer-readable record medium which contains a volume management program is provided. The volume management program forms a plurality of storage devices into a plurality of layers of volume, and re-arranges a location of a layer where a data block is stored according to its access degree, thereby providing a volume management method having much lower power consumption of the storage devices.

14 Claims, 2 Drawing Sheets

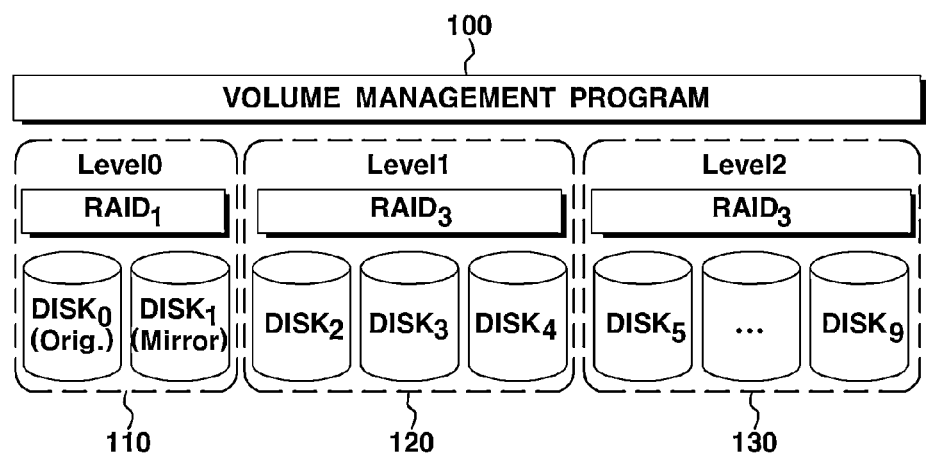
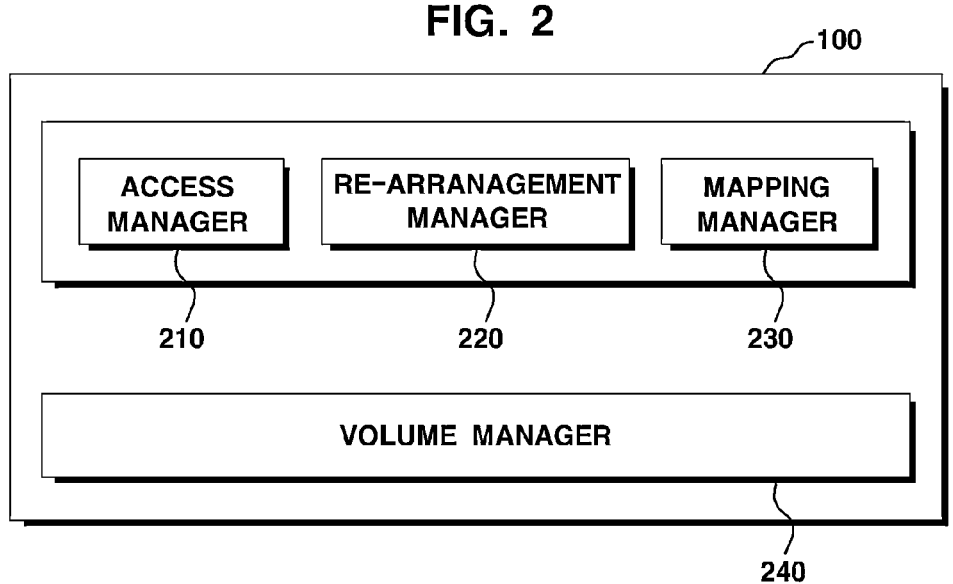

METHOD FOR VOLUME MANAGEMENT

CROSS-REFERENCE TO RELATED APPLICATIONS

This application claims priority from Korean Patent Applications No. 10-2012-0007238 and No. 10-2012-0007250, filed in the Korean Intellectual Property Office on Jan. 25, 2012, the disclosure of which is incorporated herein by reference.

TECHNICAL FIELD

Methods and apparatuses consistent with the exemplary embodiments relate to a method for volume management, and more particularly, to a method for volume management which rearranges data blocks according to an amount of volume usage of each layer, or rearranges layers of accessed data blocks.

BACKGROUND ART

As responding to various environmental regulations emerged as a major issue in the global IT market, various attempts such as consolidation, virtualization, optimization, and leverage etc. are being made to increase the efficiency in managing the vast amount of energy consumed to maintain data centers and storage devices.

NomadFS is an embodiment of PDC, which manages access frequencies of files using multi cues. Herein, each cue is mapped with a disk and moves the files in each cue to the corresponding disk. The most upper cue contains files with the highest frequencies and may continue using the mapped disk, while the use frequency of the disk mapped with the lowest cue is reduced and spinned-down.

This method reduces the power consumption of the disks having files with low access frequencies, but may overload some of the other disks, thereby decreasing the overall performance.

PARAID and Energy-Efficient Framework also have problems since they do not take into consideration the characteristics of data such as access frequencies. On the other hand, MAID is a method which stratifies storage devices into layers to differentiate power consumption and selects the data to be located in each storage device. PDC uses a method of stratifying power consumption of storage devices based on their data access frequencies.

However, it is necessary to seek a way to provide a RAID method having an even lower power consumption rate, besides the above methods.

SUMMARY OF INVENTION

1. Solution to Problem

A purpose of the present disclosure is to solve the aforementioned problems, that is, to provide a method for volume management which configures a plurality of storage devices into a plurality of layers of volume, and which rearranges the layers to store data blocks according to their access degrees.

Another purpose of the present disclosure is to configure a plurality of storage devices into a plurality of layers of volume, and when an access has occurred in a data block, to determine whether or not to rearrange the accessed data block, and if it is determined that re-arranging the data block is necessary, to move the accessed data block from a current layer to another layer.

2. Means for Solving Problems

An aspect of the exemplary embodiments relates to a computer-readable record medium which contains a volume management program which may include a volume manager which forms and manages a plurality of storage devices into a plurality of layers of volume; an access manager which manages a record state and access state of each data block; a re-arrangement manager which determines a layer of each data block based on whether or not each data block is accessed, and changes a storage location of each data block according to the determined layer of each data block; and a mapping manager which connects a physical block number with a logical block number of a file system and manages them.

In addition, the plurality of layers may include a level 0 layer where data having a high access frequency is stored, a level 1 layer where data having an intermediate access frequency is stored, and a level 2 layer where data having a low access frequency is stored.

Furthermore, the re-arrangement manager may perform a re-arrangement operation when a certain amount or more storage space of each layer is used.

In addition, the re-arrangement manager may move a certain amount of data blocks stored in the level 0 layer volume to the level 1 layer volume, when a usage rate of storage space of the level 0 layer is or above a reference value.

Furthermore, the re-arrangement manager may move a certain amount of data blocks stored in the level 1 layer volume to the level 0 layer volume or the level 2 layer volume based on an access bitmap value, when a usage rate of storage space of the level 1 layer volume is or above a reference value.

In addition, the re-arrangement manager may contain a volume management program which moves data blocks where access occurred of among data blocks recorded in the level 2 layer volume to the level 1 layer volume.

Meanwhile, according to another exemplary embodiment of the present disclosure, a computer-readable record medium which contains a volume management program may include a volume manager which forms and manages a plurality of storage devices into 3 layers of volume; an access manager which manages a record state or access state of each data block; a re-arrangement manager which, when an access has occurred in a data block, determines whether or not to re-arrange the accessed data block, and if it is determined that re-arranging the data block is necessary, moves the accessed data block from a current layer to another layer of among the plurality of layers; and a mapping manager which connects a physical block number with a logical block number of a file system and manages them.

In addition, the 3 layers may include a level 0 layer where data having a high access frequency is stored, a level 1 layer where data having an intermediate access frequency is stored, and a level 2 layer where data having a low access frequency is stored.

Furthermore, when a read access has occurred in a data block of the level 0 layer volume, the access manager may move an item corresponding to the accessed data block to a head portion of an access list.

In addition, when a read access has occurred in a data block of the level 1 layer volume and an access bitmap value of the accessed data block is "0", the access manager may change the access bitmap value of the accessed data block to "1".

Furthermore, when the read access has occurred in a data block of the level 1 layer volume and the access bitmap value of the accessed data block is "1", the re-arrangement manager may move the accessed data block to the level 0 layer volume.

In addition, when there is no empty data block in the level 0 layer volume, the re-arrangement manager may move a certain data block of the level 0 layer volume to the level 1 layer volume, and then move the data block accessed in empty data space obtained by the movement to the level 0 layer volume.

3. Effects of the Invention

According to various exemplary embodiments of the present disclosure, it is possible to configure a plurality of storage devices into a plurality of layers of volume and to rearrange storage locations of the layers for data blocks according to their access degrees, enabling volume management of storage devices with lower power consumption.

In addition, it is possible to configure and manage the plurality of storage devices into the plurality of layers of volume, and when an access has occurred in a data block, it is possible to determine whether or not to rearrange the accessed data block, and if it is determined that a rearrangement is necessary, it is possible to move the accessed data block from a current layer to another layer of among the plurality of layers, thereby reducing power consumption rates of the storage devices.

BRIEF DESCRIPTION OF THE DRAWINGS

The above and/or other aspects of the present disclosure will be more apparent by describing certain present disclosure with reference to the accompanying drawings, in which:

FIG. 1 illustrates a structure of storage devices which are managed by a volume management program which stratifies and manages a plurality of storage devices, according to an exemplary embodiment of the present disclosure;

FIG. 2 illustrates a structure of a volume management program for managing a plurality of storage devices formed as in FIG. 1, according to an exemplary embodiment of the present disclosure.

DETAILED DESCRIPTION

Figure 3:
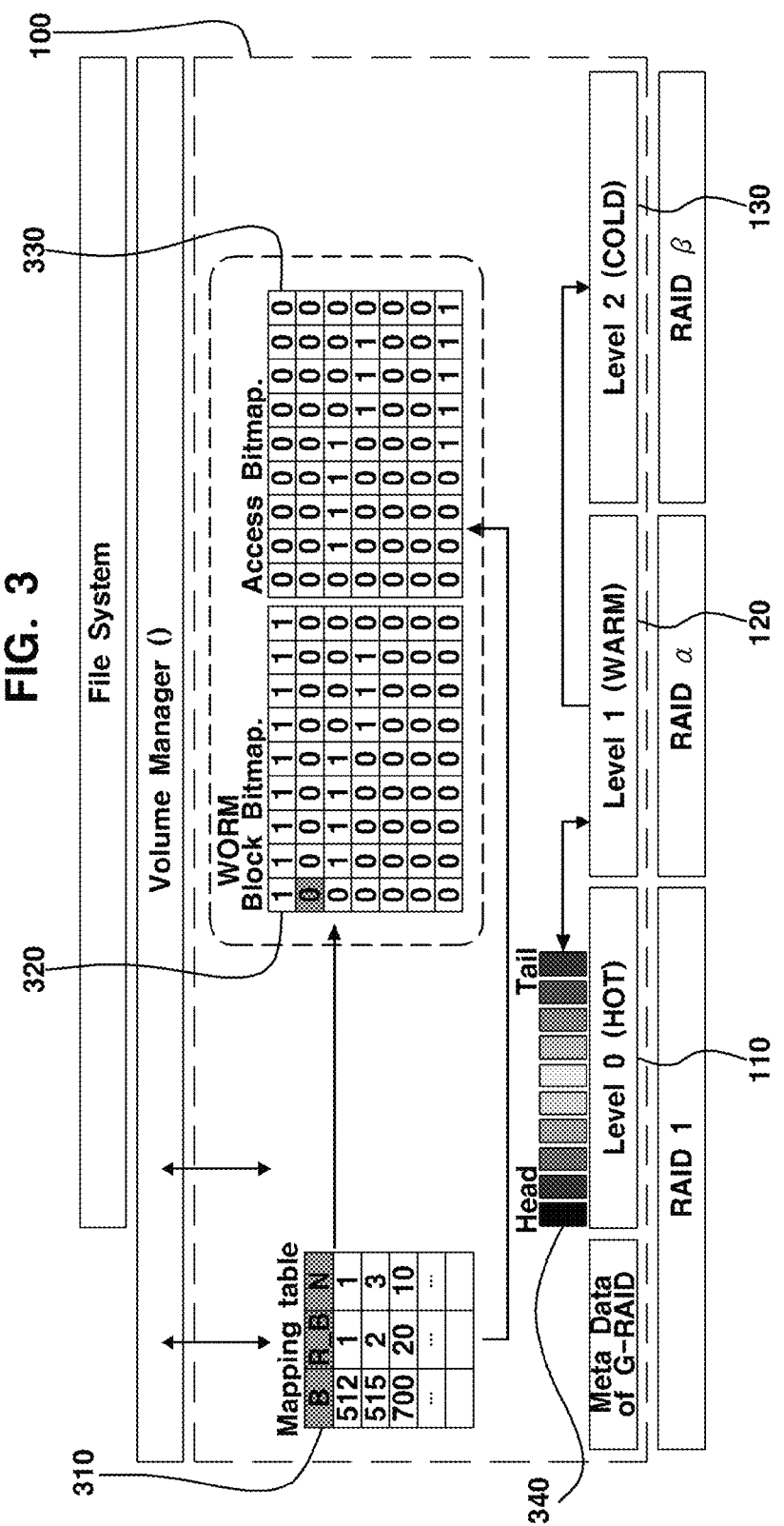
FIG. 3 illustrates a process of a plurality of storage devices being managed by a volume management program, according to an exemplary embodiment of the present disclosure.

Certain exemplary embodiments are described in higher detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 illustrates a structure of storage devices which are managed by a volume management program 100 which stratifies and manages a plurality of storage devices, according to an exemplary embodiment of the present disclosure. FIG. 1 illustrates a volume structure consisting of 10 storage devices from DISK 0 to DISK 9. However, this assumption that there are 10 storage devices has been made for convenience of explanation, and thus there is no limitation to the number of storage devices.

As illustrated in FIG. 1, in the volume management program 100 according to the exemplary embodiment of the present disclosure, 10 storage devices are divided into 3 layers of volume and managed. The volume management program 100 refers to a Logical Volume Management program which is executed by a computer for managing a plurality of storage devices.

Level 0 layer volume 110 is an upper most layer which stores only data with a highest access frequency. It is a layer which consumes the most power since storage devices are maintained in spin-up conditions. Important data with high access frequency is stored in level 0 layer, and thus storage devices inside this layer are formed as mirror of RAID-1. Therefore, as illustrated in FIG. 1, we can see that DISK 0 becomes an original disk while DISK 1 becomes a mirror disk. Data with high access frequency which is stored in level 0 layer is also called Hot Data.

Level 1 layer volume 120 is an intermediate layer which stores data with a mid-level degree of frequency. This layer consumes an intermediate amount of power, and since data with an intermediate degree of frequency is stored in this level 1 layer, storage devices inside this layer are formed in one volume. Therefore, as illustrated in FIG. 1, DISK 2 to DISK 4 use one of RAID-3 to RAID-5 to form one volume. Data having an intermediate degree of frequency stored in this level 1 layer is also called Warm Data.

Level 2 layer volume 130 is a lowest layer which stores data having a low access frequency, and consumes a lowest amount of power. In this level 2 layer, data with a low degree of frequency is stored, and storage devices inside this layer forms one volume. Therefore, as illustrated in FIG. 1, DISK 5 to DISK 9 use one of RAID-3 to RAID-5 to form one volume. Data with a low degree of frequency stored in this level 2 layer is also called Cold Data.

As illustrated in FIG. 1, when a plurality of storage devices are formed by the volume management program 100, a computer classifies each data block according to its access frequency and records the data in a storage device of an appropriate layer. Accordingly, the storage devices configured by the volume management program 100 uses power efficiently.

FIG. 2 illustrates a structure of a volume management program 100 for managing a plurality of storage devices formed as in FIG. 1, according to an exemplary embodiment of the present disclosure. As illustrated in FIG. 2, the volume management program 100 includes an access manager 210, re-arrangement manager 220, mapping manager 230, and volume manager 240.

The access manager 210 manages a record state and access of each data block.

The re-arrangement manager 220 determines a layer of each data block based on whether or not each data block is accessed, and performs an operation of changing a storage location of the data block according to the determined layer of the data block.

The mapping manager 230 connects a physical block number selected by the volume management program 100 with a logical block number of a file system so that stratification management of blocks can be made independently from the file system.

The volume manager 240 configures the plurality of storage devices illustrated in FIG. 1 into 3 layers of volume and manages them. That is, the volume manager 240 configures the plurality of storage devices into level 0 layer volume 110, level 1 layer volume 120, and level 2 layer volume 130, and manages them.

By such a configuration, the volume management program 100 classifies data blocks into 3 states: HOT, WARM, and COLD, according to the access frequency of each data block, and stores the data blocks in storage devices of the corresponding layers of among the 3 layers, according to the classification. As such, by using a different RAID policy in each layer for each storage device, the volume management program 100 becomes able to maintain data reliability while increasing space utilization and minimizing power consumption.

The volume management program 100 performs all writing operations in storage devices in level 1 layer (WARM), and each data block of level 1 layer re-determines the storage location by its access frequency after a certain period of time. Using a characteristic that 50% of all data is not accessed after it is generated, the volume management program 100 moves data that is not accessed for a certain period of time after it is generated to a storage device of level 2 layer (COLD). Through this, by storing COLD data block which is almost not accessed in the spin-downed level 2 layer, the volume management program 100 becomes able to reduce power consumption.

When a layer of a data block is changed, the mapping manager 230 of the volume management program 100 performs a re-connecting operation of re-connecting a changed physical block number with a logical block number of a file system. The re-connecting operation is for sharing with the file system the storage location of each data block which has been changed by an access frequency, that is, an operation for the sake of connecting the logical block number which the file system perceives with the physical block number of the actual storage device. Thus, when a data block re-arrangement operation occurs for stratification management according to its usage frequency, such an operation is necessary for an interlocked operation with the file system.

FIG. 3 illustrates a process of managing a plurality of storage devices by the volume management program 100 method, according to an exemplary embodiment of the present disclosure.

As illustrated in FIG. 3, the mapping manager 230 uses a mapping table 310 to connect a physical block number with a logical block number of a file system. More specifically, the mapping table 310 consists of 3 elements: logical block number B, physical block number R_B, and number of successive blocks N. For example, in a case where B, R_B, and N are 515, 2, and 3, the 3 successive blocks 2, 3, and 4 are allocated to logical block number 515.

The access manager 210 uses a Block Bitmap 320 to manage whether or not a physical block is used. For example, each bit of the Block Bitmap 320 indicates a physical block, '0' meaning that a block is empty, and '1' meaning that the block is in use. A block state manager becomes able to check blocks that are currently not in use using the Block Bitmap 320.

The access manager 210 performs an operation of measuring whether or not each data block of level 1 layer is accessed. The operation of measuring access is performed only in the storage device of level 1 layer (WARM). The purpose of such an operation is to minimize power consumption by maintaining the state of the storage device of level 2 layer (COLD) based on the characteristic of data that "50% of all files are not accessed at all after they are generated", and to minimize a number of re-arrangement operations for acquiring spare space in the level 0 layer (HOT) storage device, thereby preventing disk I/O performance reduction.

The access manager 210 uses an Access Bitmap 330 to manage whether or not each data block is accessed. Each bit of the Access Bitmap 330 indicates whether or not a physical block which is located in level 1 layer volume 120 is accessed, and when there is no data access, the bit value is '0', and when a data access has occurred, the bit value is '1'. As aforementioned, the access manager uses the Access Bitmap 330 to manage whether or not data blocks have been accessed.

The re-arrangement operation by the re-arrangement manager 220 is an operation of changing a storage location according to a state (HOT/WARM/COLD) of each data block, that is, a core operation by the volume management program 100 of efficiently using data storage space by selecting appropriate data recovering policies, thereby maintaining data reliability while reducing power consumption.

However, frequent re-arrangement operations may reduce I/O performance of the entire system and increase power consumption, and thus a re-arrangement operation is performed based on a certain rule.

As a first method, the re-arrangement manager 220 may perform a re-arrangement operation when a certain amount or more of storage space in each layer is used.

First of all, the access manager 210 uses an access list 340 according to a Least Recently Used (LRU) algorithm regarding level 0 layer volume 110 to measure an approximate access frequency of a data block. Herein, in the access list 340, items corresponding to all data blocks of level 0 layer volume 110 are listed successively. In addition, a front portion of the access list 340 is referred to as a Head, while a back portion of the access list 340 is referred to as a Tail, and the closer a data block is to the Head, the more recently the data block has been accessed, while the closer a data block is to the Tail, the longer a last access point of the data block is from now.

In addition, in a case where a usage rate of storage space of level 0 layer volume 110 is or above a reference value, the re-arrangement manager 220 moves a certain amount of data blocks starting from those closer to the Tail of the access list 340, to level 1 layer volume 120.

In addition, the access manager 210 manages the access states regarding level 1 layer volume 120 by the 'Access Bitmap 330'. Furthermore, when the usage rate of storage space of level 1 layer volume 120 is or above a reference value, the re-arrangement manager 220 moves all blocks which are currently located in the storage device of level 1 layer and which have "0" as the bit value of the Access Bitmap 330 to level 2 layer volume 130. In addition, regarding data blocks where the Access Bit value is currently set as "1", the re-arrangement manager 220 moves corresponding data blocks directly to level 0 layer volume 110. As such, when the usage rate of the storage space of level 1 layer volume 120 is or above the reference value, the re-arrangement manager 220 moves a certain amount of data blocks stored in level 1 layer volume 120 to level 0 layer volume 110 or level 2 layer volume 130 with reference to the value of the Access Bitmap 330.

Furthermore, the re-arrangement manager 220 moves data blocks where access have occurred of among the data blocks recorded in level 2 layer volume 130 directly to level 1 layer volume 120.

As aforementioned, the re-arrangement manager 220 may perform a re-arrangement operation when a certain amount of the storage space of each layer is in use.

As a second method, the re-arrangement manager 220 may determine whether or not a re-arrangement is necessary whenever an access occurs in a data block, and perform a re-arrangement operation of the data block. That is, when an access occurs in a data block, the re-arrangement manager 200 may determine whether or not the data block needs to be re-arranged, and if it is determined that a re-arrangement is necessary, the re-arrangement manager 220 moves the accessed data block from a current layer to another layer of among the above 3 layers.

In a case where a read access occurs in a data block of level 0 layer volume 110, the access manager 210 moves items corresponding to the data block accessed to a head portion of the access list 340. Herein, the access list 340 is a list for managing data blocks of level 0 layer volume 110 using a Least Recently Used (LRU) algorithm. In the access list 340, items corresponding to all data blocks of level 0 layer volume 110 are listed successively. In addition, a front portion of the access list 340 is called a Head, while a back portion of the access list 340 is called a Tail, and the closer a data block is to the Head, the more recently the data block has been accessed, while the closer a data block is to the Tail, the longer a last access point of the data block is from now.

In a case where a read access has occurred in a data block of level 1 layer volume 120, the re-arrangement manager 220 determines whether or not an access bitmap 330 value of the accessed data block is "0". In addition, if the access bitmap 330 value of the accessed data block is "0", the re-arrangement manager 220 sets "1" as the access bitmap 330 value of the accessed data block.

On the other hand, if the access bitmap 330 value of the accessed data block is "1", the re-arrangement manager 220 determines whether or not there is an empty data block in level 0 layer volume 110. If there is an empty data block in level 0 layer volume 110, the re-arrangement manager 220 moves the accessed data block to level 0 layer volume 110.

But, if there is no empty data block in level 0 layer volume 110, the re-arrangement manager 220 checks the access list 340 of level 0 layer volume 110 and moves the data block corresponding to the Tail to level 1 layer volume 120 to obtain empty space. In addition, the re-arrangement manager 220 moves the accessed data block to the obtained empty space of level 0 layer. Herein, if there is no empty data block even in level 1 layer volume 120, the re-arrangement manager 220 selects the data block of which the access bitmap 330 value is "0" of among the data blocks in level 1 layer, and moves the selected data block to level 2 layer. In addition, the re-arrangement manager 220 moves the data block corresponding to the Tail to the obtained empty space of level 1 layer volume 120.

As aforementioned, in a case where the access bitmap 330 value of the accessed data block is "1", the accessed data block is a data block which has been accessed once recently, and thus the re-arrangement manager 220 moves the accessed data block to level 0 layer volume 110.

Meanwhile, in a case where a read access has occurred in a data block of level 2 layer volume 130, the re-arrangement manager 220 moves the data block to level 1 layer volume 120. Herein, if there is no empty data block in level 1 layer volume 120, the re-arrangement manager 220 selects the data block of which the access bitmap 330 value is "0" of among the data blocks of level 1 layer, and moves the selected data blocks of level 1 layer to level 2 layer. In addition, the re-arrangement manager 220 moves the accessed data block to the obtained empty space in level 1 layer volume 120.

As aforementioned, the re-arrangement manger 220 may determine whether or not to re-arrange a block whenever an access occurs in a data block, and perform a re-arrangement operation of the data block.

Meanwhile, it is a matter of course that this technical concept of the present disclosure can be applied to a computer-readable record medium which contains a computer program which enables performing functions of the volume management program 100 according to this exemplary embodiment. In addition, the technical concept according to various exemplary embodiments of the present disclosure may also be embodied in a format of a computer-readable code recorded in a computer-readable record medium. Any data storage device which can be read by a computer and can store data may be a computer-readable record medium. For example, a ROM, RAM, CD-ROM, magnetic tape, floppy disk, optical disk, and hard drive etc. may be a computer-readable record medium. In addition, computer-readable codes and programs stored in a computer-readable record medium can be transmitted through inter-computer networks.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory computer-readable record medium storing a volume management program, the program comprising:
   a volume manager configured to form and manage a plurality of storage devices into a plurality of layers of storage space;
   an access manager configured to manage a record state and access state of each data block;
   a re-arrangement manager configured to
      determine a layer of each data block based on whether or not each data block is accessed, and
      change a storage location of each data block according to the determined layer of each data block; and
   a mapping manager configured to
      connect a physical block number with a logical block number of a file system, and
      manage the physical block number connected with the logical block number of the file system,
   wherein the plurality of layers comprises:
      a level 1 layer where data having an first access frequency is stored,
      a level 2 layer where data having an second access frequency is stored, and
      a level 3 layer where data having an third access frequency is stored,
   wherein
      the first access frequency is higher than the second access frequency, and
      the second access frequency is higher than the third access frequency, and
   wherein
      the level 1 layer is where the storage devices are maintained in a spin-up condition, and
      the level 3 layer is where the storage devices are maintained in a spin-down condition.

2. The non-transitory computer-readable record medium according to claim 1, wherein the re-arrangement manager is further configured to perform a re-arrangement operation when at least one layer uses more storage space than a predetermined amount.

3. The non-transitory computer-readable record medium according to claim 2, wherein the re-arrangement manager is further configured to move a number of data blocks stored in the level 1 layer to the level 2 layer, when a usage rate of storage space of the level 1 layer is or above a reference value.

4. The non-transitory computer-readable record medium according to claim 2, wherein the re-arrangement manager is further configured to move a number of data blocks stored in the level 2 layer to the level 1 layer or the level 3 layer based on an access bitmap value, when a usage rate of storage space of the level 2 layer is or above a reference value.

5. The non-transitory computer-readable record medium according to claim 2, wherein the re-arrangement manager is further configured to move data blocks where access occurred among data blocks recorded in the level 3 layer to the level 2 layer.

6. The non-transitory computer-readable record medium according to claim 1, wherein the level 1 layer includes a storage device and a mirror storage device of the storage device.

7. A non-transitory computer-readable record medium which contains a volume management program comprising:
   a volume manager which forms and manages a plurality of storage devices into a plurality of layers of volume;
   an access manager which manages a record state or access state of each data block;
   a re-arrangement manager which, when an access has occurred in a data block, determines whether or not to re-arrange the accessed data block, and if it is determined that re-arranging the data block is necessary, moves the accessed data block from a current layer to another layer of among the plurality of layers; and
   a mapping manager which connects a physical block number with a logical block number of a file system and manages the physical block number connected with the logical block number of the file system,
   wherein the plurality of layers comprises:
      a level 1 layer where data having an first access frequency is stored,
      a level 2 layer where data having an second access frequency is stored, and
      a level 3 layer where data having an third access frequency is stored,
   wherein
      the first access frequency is higher than the second access frequency, and
      the second access frequency is higher than the third access frequency, and
   wherein, when a read access has occurred in a data block of the level 1 layer volume, the access manager moves an item corresponding to the accessed data block to a head portion of an access list.

8. The non-transitory computer-readable record medium according to claim 7, wherein the level 1 layer is where the storage devices are maintained in a spin-up condition, and the level 3 layer is where the storage devices are maintained in a spin-down condition.

9. The non-transitory computer-readable record medium according to claim 7, wherein the level 1 layer includes a storage device and a mirror storage device of the storage device.

10. A non-transitory computer-readable record medium which contains a volume management program comprising:
    a volume manager which forms and manages a plurality of storage devices into a plurality of layers of volume;
    an access manager which manages a record state or access state of each data block;
    a re-arrangement manager which, when an access has occurred in a data block, determines whether or not to re-arrange the accessed data block, and if it is determined that re-arranging the data block is necessary, moves the accessed data block from a current layer to another layer of among the plurality of layers; and
    a mapping manager which connects a physical block number with a logical block number of a file system and manages the physical block number connected with the logical block number of the file system,
    wherein the plurality of layers comprises:
       a level 1 layer where data having an first access frequency is stored,
       a level 2 layer where data having an second access frequency is stored, and
       a level 3 layer where data having an third access frequency is stored,
    wherein
       the first access frequency is higher than the second access frequency, and
       the second access frequency is higher than the third access frequency, and
    wherein, when a read access has occurred in a data block of the level 2 layer volume and an access bitmap value of the accessed data block is 1, the access manager changes the access bitmap value of the accessed data block to bit 2.

11. The non-transitory computer-readable record medium according to claim 10, wherein, when the read access has occurred in a data block of the level 2 layer volume and the access bitmap value of the accessed data block is 2, the re-arrangement manager moves the accessed data block to the level 1 layer volume.

12. The non-transitory computer-readable record medium according to claim 11, wherein, when there is no empty data block in the level 1 layer volume, the re-arrangement manager moves a certain data block of the level 1 layer volume to the level 2 layer volume, and then moves the data block accessed in empty data space obtained by the movement to the level 1 layer volume.

13. The non-transitory computer-readable record medium according to claim 10, wherein the level 1 layer is where the storage devices are maintained in a spin-up condition, and the level 3 layer is where the storage devices are maintained in a spin-down condition.

14. The non-transitory computer-readable record medium according to claim 10, wherein the level 1 layer includes a storage device and a mirror storage device of the storage device.

* * * * *